United States Patent [19]

Born et al.

[11] Patent Number: 5,004,886
[45] Date of Patent: Apr. 2, 1991

[54] METHOD OF APPLYING WEAR-RESISTANT LAYER AND CONSUMABLE ELECTRODE FOR CARRYING OUT THE METHOD

[75] Inventors: Dieter Born, Ratingen; Peter Knauf, Mettmann; Hans-Joachim Retelsdorf, Zirndorf, all of Fed. Rep. of Germany

[73] Assignee: Durum Verschleissschutz GmbH, Krefeld, Fed. Rep. of Germany

[21] Appl. No.: 526,230

[22] Filed: May 18, 1990

[30] Foreign Application Priority Data

May 20, 1989 [DE] Fed. Rep. of Germany ....... 3916559
Mar. 14, 1990 [DE] Fed. Rep. of Germany ....... 4008091

[51] Int. Cl.$^5$ ............................................. B23K 9/04
[52] U.S. Cl. ............................ 219/76.14; 219/146.51
[58] Field of Search ................... 219/76.1, 76.14, 77, 219/146.51

[56] References Cited

U.S. PATENT DOCUMENTS 2,137,471 11/1938 Zublin ........................... 219/146.51
3,999,036 12/1976 Muratov et al. ................. 219/76.14
4,228,223 10/1980 Knotek et al. .................. 219/146.51

FOREIGN PATENT DOCUMENTS 2440995 7/1987 Fed. Rep. of Germany .
8716743 2/1988 Fed. Rep. of Germany .

Primary Examiner—Clifford C. Shaw
Attorney, Agent, or Firm—Herbert Dubno

[57] ABSTRACT

A consumable nickel-tungsten-carbon electrode is used in arc welding deposition of a corrosion resistant layer producing a nickel-alloy matrix containing tungsten carbide inclusions on a surface of a metal workpiece by electric arc deposition under parameters such that there is either practically no solubilization of the tungsten carbide grains in the filling of the nickel tube of the electrode or there is substantially complete solubilization of the tungsten carbide grains and reprecipitation of the tungsten carbide inclusions in the matrix on cooling.

10 Claims, 2 Drawing Sheets

METHOD OF APPLYING WEAR-RESISTANT LAYER AND CONSUMABLE ELECTRODE FOR CARRYING OUT THE METHOD

FIELD OF THE INVENTION

The present invention relates to a process for applying a wear-resistant layer to a conductive surface of a substrate and, in particular, to a method whereby a layer consisting of a nickel-alloy matrix and tungsten carbide inclusions can be applied to a surface of a substrate to be protected utilizing electric arc welding techniques.

The invention also relates to an electrode for carrying out this process. The wear-resistant protective coating or layer can be used especially to cover wear surfaces of tools and apparatus used in mining, in deep well drilling, in the ceramics industry and in like applications in which a metal substrate may come into contact with an abrasive medium.

BACKGROUND OF THE INVENTION

The basic methods used in the past to apply a wear resistant layer to metal substrates, such as the wear surfaces of tools and the like adapted to contact an abrasive medium have hitherto utilized autogenous welding processes or electric arc welding techniques. The welding rod or welding wire is so constructed that it has the desired composition of the wear-resistant layer and is consumed in a deposition welding operation in the formation of the coating on the surface.

In the autogenous welding process, welding additives are employed so that after the formation of the deposit weld, i.e. the weldment, tungsten carbide is found as inclusions in an iron-alloy matrix or in a nickel-alloy matrix.

The welding rod or welding wire in these systems generally comprise an iron tube which is filled with tungsten carbide grains or particles. The tungsten carbide which is employed can be a granulated tungsten-fused carbide product or tungsten carbide/cobalt pellets. The degree of filling of the iron tubes is about 80%.

It is also known in conjunction with an autogenous welding process to operate with tubes composed of an iron/chromium/nickel alloy which are filled in the aforedescribed manner with tungsten particles. The product of this process includes a matrix in the form of a corrosion resistant alloy and in which the tungsten carbide inclusions are present.

If one replaces the iron tubes by nickel tubes and fills the nickel tubes with tungsten carbide grains along with other alloy elements which are to be present in the matrix, in finely divided form, one can obtain a wear resistant layer having, for example, a nickel/chromium/boron/silicon matrix in the form of a corresponding alloy by the autogenous deposition technique.

In the electric arc welding process for applying wear resistant coatings, one can operate with rod electrodes or solid wire electrodes utilizing unalloyed iron tubes which are filled in the aforedescribed manner (compare German Utility model DE-GM No. 87 16 743, German Patent DE-PS No. 24 40 995 and U. S. Pat. No. 2,137,471).

The electric arc welding technique utilizing consumable electrodes to form a coating having a nickel-alloy matrix in accordance with prior art teachings have not, however, been found to be satisfactory heretofore.

Investigations have shown that the alloy composition of the nickel-alloy matrix has a variety of influences on the structure and the degree of solubilization of the tungsten carbide contained in the electrode. As a consequence, the structure of the tungsten carbide inclusions in the welding deposit layer becomes quite undefined and is not controllable. Accordingly, reproducible coatings of tungsten carbide inclusions in a nickel-alloy matrix cannot be formed by the prior art arc welding deposition techniques to yield uniform wear resistance and reliable protection of the surfaces treated.

OBJECTS OF THE INVENTION

It is, therefore, the principal object of the present invention to provide an improved method of or process for the electric arc welding deposition of protective wear resistant coatings on a surface of a substrate which will have a well defined nickel-alloy matrix composition with a well defined structure of tungsten carbide inclusions so that the coating will afford reliable and reproducible wear resistant properties.

Another object of the invention is to provide an electrode for the coating of metal substrates by electric arc welding techniques to provide more reliable, reproducible and otherwise improved wear resistant coatings.

SUMMARY OF THE INVENTION

We have discovered that it is possible to overcome the drawbacks of the earlier processes by effecting the electric arc deposition coating of a conductive surface of a substrate, especially a wear surface of a tool or the like adapted to contact an abrasive medium, by providing the electrode from which the coating is deposited so that it has a nickel tube which contains tungsten carbide granules with a grain size or particle size of 0.3 to 2.0 millimeters in the presence of a nickel and nickel-alloy component system, consisting essentially of 50 to 40% by weight nickel, 45 to 55% by weight tungsten, 0.1 to 1.5% by weight boron, 3 to 4% by weight carbon and 0 to 2% by weight silicon with the total $(C+B+Si)=5\%$ by weight, or 40 to 20% by weight nickel, 10−4% by weight chromium, 5 to 2% by weight silicon, 3 to 1% by weight boron, 40–70% by weight tungsten and 2 to 3% by weight carbon, so that in each case the specified composition includes the tungsten and carbon of the tungsten carbide, depending upon the type of electrode used the nickel of the tube and the aforementioned composition constituting 100% of the weldment forming the layer, and controlling the welding parameters so that there is practically no solubilization of the tungsten carbide grains in the nickel-alloy matrix.

We have found that the first mentioned composition is applicable in the case of a rod-type electrode, in which case the parameters of the electric arc deposition welding can include a voltage between the electrode and the substrate to 22 to 28 volts and a current passing between the electrode and the workpiece of 70 to 150 amperes.

The second composition is applicable in the case of consumable solid wire electrode which can also, like the rod, utilize a nickel tube in which the tungsten carbide and other members of the aforementioned composition are incorporated as a filling and in which case the arc welding parameters include a voltage of 22 to 26 volts and a welding current of 180 to 280 amperes.

Under these conditions, we are able to provide highly reproducible nickel-alloy matrix coating with tungsten carbide inclusions which constitute the grains of the filling in an intact form or from which the grains can precipitate upon cooling. The latter is found to be the case when the tungsten carbide grains within the filling originally are of a particle size of 0.01 to 0.3 millimeters, the welding voltage is 22 to 26 volts with an arc current of 120 to 220 amperes in the case of the rod type electrode and 200 to 320 amperes in the case of the filled-wire or solid wire electrode.

In all cases, the filling composition including the nickel, its alloy ingredients and the tungsten and carbon (or tungsten carbide particles) can be contained in a nickel tube with an outer diameter of 1.5 to 8 millimeters and a wall thickness of 0.2 to 2 millimeters.

The tungsten carbide which is used can be a tungsten-fused-carbide in granular form, a tungsten carbide in the form of balls or as tungstem carbide/cobalt pellets.

The electrodes of the compositions described are also the subject of this invention. More specifically, in a first embodiment of the invention the process applying the wear-resistant layer to an electrically conductive surface comprises the steps of:

(a) juxtaposing with the surface a consumable rod-shaped electrode comprised of a nickel tube and, within the tube, a filling consisting of:
50 to 40 percent by weight nickel,
45 to 55 percent by weight tungsten,
0.1 to 1.5 percent by weight boron,
3 to 4 percent by weight carbon, and
0 to 2 percent by weight silicon,
the sum of carbon, boron and silicon being substantially 5 percent by weight, and including a fluxing agent and tungsten carbide particles in the filling of a grain size of 0.3 to 2.0 mm in the tube, the nickel of the tube and the aforementioned composition constituting 100% of the weldment forming the layer;

(b) depositing the layer on the substrate by arc welding deposition from the rod-shaped electrode so that the layer is formed as a nickel-alloy matrix containing tungsten carbide grains as inclusions; and (c) controlling arc welding parameters of the arc welding deposition so that a voltage of 22 to 26 volts is applied across the rod-shaped electrode and the substrate and a current of 70 to 150 amperes passes between the rod-shaped electrode and the substrate, and such that there is practically no solubilization of the tungsten carbide grains in the nickel-alloy matrix during the arc welding deposition.

In another embodiment the process comprises:

(a) juxtaposing with the surface a consumable filled-wire electrode comprised of a nickel tube and, within the tube, a filling consisting of:
40 to 20 percent by weight nickel,
10 to 4 percent by weight chromium,
40 to 70 percent by weight tungsten,
3 to 1 percent by weight boron,
2 to 3 percent by weight carbon, and
5 to 2 percent by weight silicon,
and including a fluxing agent and tungsten carbide particles in the filling of a grain size of 0.3 to 2.0 mm in the tube, the nickel of the tube and the aforementioned composition constituting 100% of the weldment forming the layer;

(b) depositing the layer on the substrate by arc welding deposition from the rod-shaped electrode so that the layer is formed as a nickel-alloy matrix containing tungsten carbide grains as inclusions; and (c) controlling arc welding parameters of the arc welding deposition so that a voltage of 22 to 26 volts is applied across the rod-shaped electrode and the substrate and a current of 180 to 260 amperes passes between the rod-shaped electrode and the substrate, and such that there is practically no solubilization of the tungsten carbide grains in the nickel-alloy matrix during the arc welding deposition.

Where solubilization of the tungsten carbide grains is to occur, the process can comprise the steps of:

(a) juxtaposing with the surface a consumable rod-shaped electrode comprised of a nickel tube and, within the tube, a filling consisting of:
50 to 40 percent by weight nickel,
45 to 55 percent by weight tungsten,
0.1 to 1.5 percent by weight boron,
3 to 4 percent by weight carbon, and
0 to 2 percent by weight silicon,
the sum of carbon, boron and silicon being substantially 5 percent by weight, and including a fluxing agent and tungsten carbide particles in the filling of a grain size of 0.01 to 0.3 mm in the tube, the nickel of the tube and the aforementioned composition constituting 100 % of the weldment forming the layer;

(b) depositing the layer on the substrate by arc welding deposition from the rod-shaped electrode so that the layer is formed as a nickel-alloy matrix containing tungsten carbide grains as inclusions; and (c) controlling arc welding parameters of the arc welding deposition so that a voltage of 22 to 26 volts is applied across the rod-shaped electrode and the substrate and a current of 120 to 220 amperes passes between the rod-shaped electrode and the substrate, and such that the tungsten carbide particles are solubilized during the arc welding deposition and tungsten carbide inclusions are precipitated in the alloy matrix upon cooling thereof.

Alternatively the process can comprise the steps of:

(a) juxtaposing with the surface a consumable filled-wire electrode comprised of a nickel tube and, within the tube, a filling consisting of:
40 to 20 percent by weight nickel,
10 to 4 percent by weight chromium,
40 to 70 percent by weight tungsten,
3 to 1 percent by weight boron,
2 to 3 percent by weight carbon, and
5 to 2 percent by weight silicon,
and including a fluxing agent and tungsten carbide particles in the filling of a grain size of 0.01 to 0.3 mm in the tube, the nickel of the tube and the aforementioned composition constituting 100% of the weldment forming the layer;

(b) depositing the layer on the substrate by arc welding deposition from the rod-shaped electrode so that the layer is formed as a nickel-alloy matrix containing tungsten carbide grains as inclusions; and (c) controlling arc welding parameters of the arc welding deposition so that a voltage of 22 to 26 volts is applied across the rod-shaped electrode and the substrate and a current of 200 to 320 amperes passes between the rod-shaped electrode and the substrate, and such that the tungsten carbide particles are solubilized during the arc welding deposition and tungsten carbide inclusions are precipitated in the alloy matrix upon cooling thereof.

The solubilization or nonsolubilization of the tungsten carbide grains in a nickel-alloy matrix has been found to follow complex thermodynamic laws. It will depend upon the surface area of the grains and the interaction of the grains with the surrounding melt and thus depends upon the composition of the melt and its temperature. It also depends upon the time.

In the first two embodiments of the invention, we have described systems in which the surface area of the grains and the analysis of the melt which is formed in the deposition process are so coordinated that, surprisingly, under the welding conditions specified there is practically no solubilization of the grains or if there is an slight solubilization there is an equivalent reprecipitation upon cooling.

The filling composition is, generally, a powder which may consist of a pulverulent nickel alloy containing the alloying ingredients specified and any tungsten and carbon which is not in the form of the tungsten carbide particles. To the extent that there is additional metallic tungsten in the comminuted alloy serving as the filling, or tungsten is solubilized from the tungsten carbide, there is a reduced tendency to solubilize additional tungsten carbide from the grains and upon cooling there is a precipitation of fine crystals of tungsten carbide in a homogeneous distribution in the matrix, the balance of which is a nickel-alloy matrix. These additional tungsten carbide crystals which can precipitate are not counted as part of the matrix but can be considered as part of the inclusions. In the last two embodiments described, the grains initially are provided in such small size that they will be solubilized and upon cooling will give rise to a homogeneous distribution of tungsten carbide crystals in the matrix as inclusions.

BRIEF DESCRIPTION OF THE DRAWING

The above and other objects, features and advantages of our invention will become more readily apparent from the following description, reference being made to the accompanying highly diagrammatic drawing in which.

SPECIFIC DESCRIPTION

Figure 1:
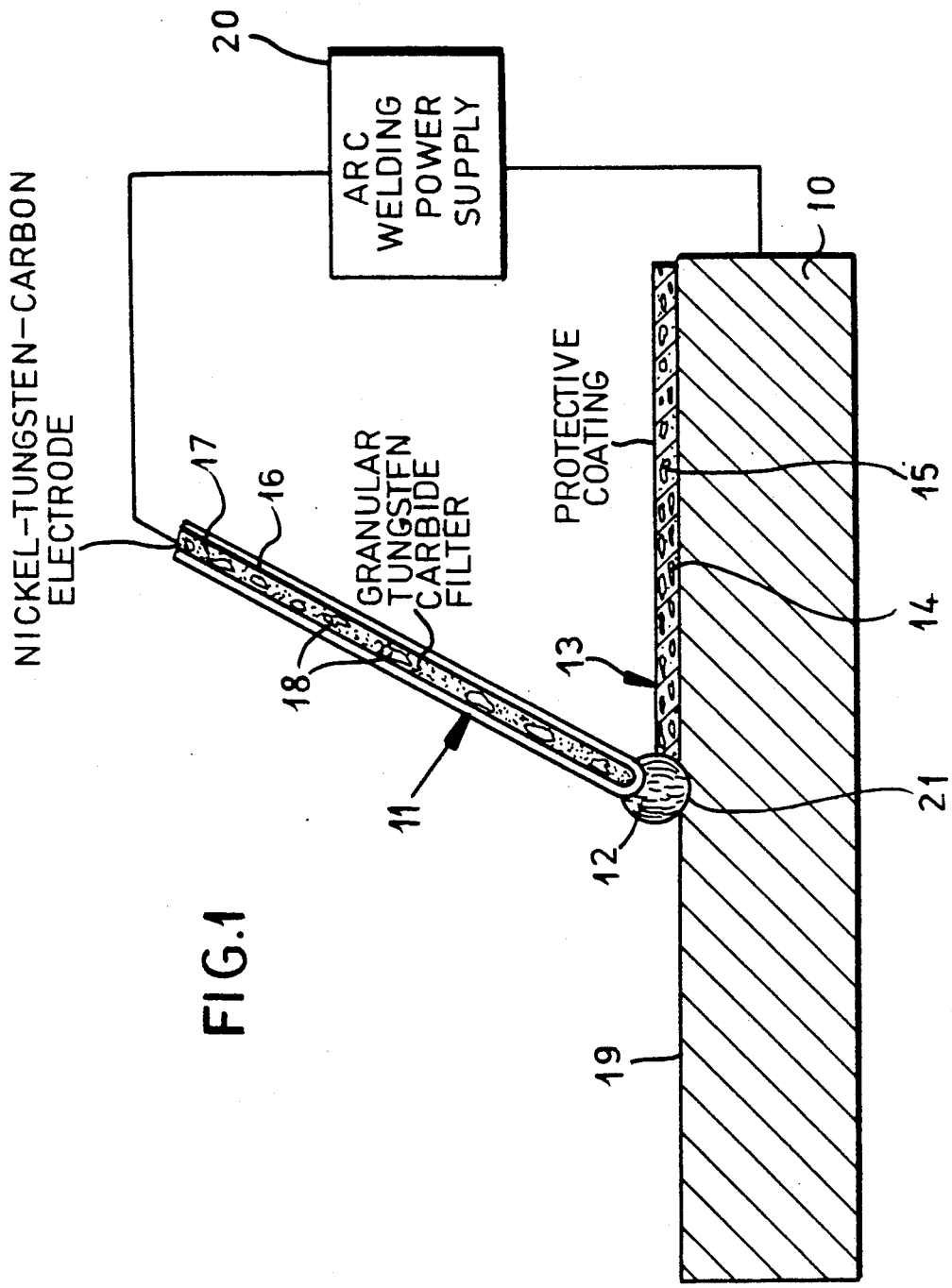
FIG. 1 is a cross sectional view in highly diagrammatic form illustrating the invention.

The electrode 11 which is used in FIG. 1 for the arc welding deposition of a protective wear resistant coating 13 on a surface 19 of a metal substrate 10, e.g. a steel tool surface which may encounter an abrasive medium in use, is connected to one terminal of an arc welding power supply 20 whose other terminal is connected to the substrate 10. As a result, an arc 12 is generated between the electrode 11 and the workpiece 10 which melts slightly the surface of the workpiece and melts the consumable electrode so that a progressively advancing pool 21 of molten metal is formed on the surface which ultimately is cooled to form the wear-resistant layer 13.

The wear-resistant layer will be constituted of a nickel-alloy matrix 14 containing inclusions of tungsten carbide and is weld bonded to the surface of the workpiece 10.

As can be seen on a small scale from FIG. 1, the electrode 11 may be a rod which can comprise a nickel tube 16 and a filling 17 of a pulverulent material, usually nickel, tungsten, boron, carbon and silicon, and also chromium, if desired, in which, in addition, tungsten carbide particles 18 are distributed.

Figure 2:
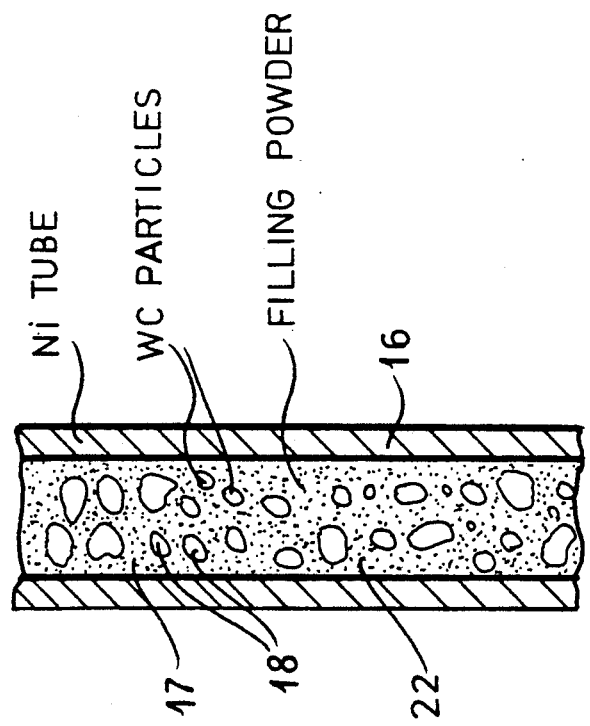
FIG. 2 is a cross sectional view through a rod electrode which can be used in the process illustrated in FIG. 1.

As illustrated in FIG. 2, for example to a larger scale, it will be seen that the filling powder can be a ground alloy of the composition described and is represented at 22 while the tungsten carbide particles are shown at 18 for the filling 17 in the tube 16. A conventional welding flux powder can likewise be incorporated in the composition and may, for example, contain or be the boron of the final composition.

If other welding flux powderrs used in deposit welds of nickel alloys are employed they are not counted as part of the filling composition and are used in conventional amounts. Preferably, however, the flux agent is incorporated in the metal alloy filling powder described.

Figure 3:
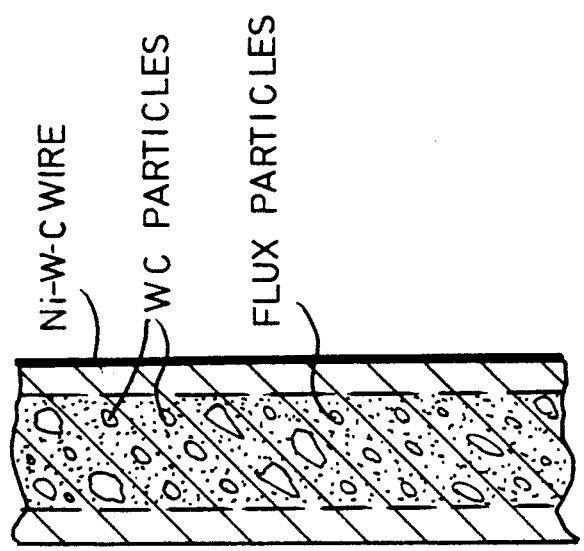
FIG. 3 is a cross sectional view through a filled wire electrode, drawn to a larger scale than FIG. 2 and adapted to be used in the method of the invention.

FIG. 3 shows a filled wire electrode in which the tungsten carbide particles and flux particles have been shown in the filling within the nickel tube.

SPECIFIC EXAMPLES

EXAMPLE 1

A rod-shaped electrode having a 5.0 millimeter outer diameter and a 1.00 millimeter wall thickness is filled with a pulverulent composition containing tungsten-fused-carbide particles of a grain size of 0.3 to 1.2 millimeters and a composition as follows:

| | | |
|---|---|---|
| Ni | 44.5 | Parts by weight |
| W | 50.0 | Parts by weight |
| B | 1.2 | Parts by weight |
| C | 3.3 | Parts by weight |
| Si | 1.0 | Parts by weight |

The deposition welding was carried out as described with the following welding parameters 24 volts and 150 amperes.

The wear-resistant layer which resulted had its matrix phase and tungsten carbide inclusion phase in a 1:1 weight ratio.

Analysis:
Matrix:

| | Analysis Matrix: | |
|---|---|---|
| Ni | 93.1 | W-Carbide: W 96% |
| W | 2.5 | C 4% |
| B | 1.3 | |
| C | 1.2 | |
| Si | 1.9 | |

EXAMPLE 2

A filled wire electrode of an outer diameter of 2.8 millimeters, formed by a nickel tube with a wall thickness of 0.2 millimeters was filled with a powdered composition containing tungsten carbide particles of a grain size of 0.3 to 1.2 millimeters and with the following composition by weight:

| | |
|---|---|
| Ni | 43.6% |
| Cr | 8.7% |
| Si | 3.6% |
| B | 2.3% |
| W | 40.0% |
| C | 1.8% |

The deposition welding was carried out as described with the following welding parameters 24 volts and 200 amperes.

The wear-resistant layer had its matrix and tungsten carbide in a weight ratio of 1.7:1.

| Matrix: | | | |
|---|---|---|---|
| Ni | 74.5% | Carbide: W | 86% |
| Cr | 13.9% | C | 4% |
| Si | 5.3% | | |
| B | 2.8% | | |
| W | 2.4% | | |
| C | 1.1% | | |

EXAMPLE 3

Filled wire electrode diameter 2.8 millimeters incorporated and fused carbide granules: 0.01 to 0.3 millimeters.

Mixture composition as in Example 2.

The deposition welding was carried out as described with the following welding parameters 28 volts and 280 amperes.

The applied wear-resistant layer homogeneously contains finely divided tungsten carbide inclusions which are not identical to the tungsten-fused-carbide originally supplied. Analysis of the wear-resistant layer:

| Ni | 44.2% |
|---|---|
| W | 40.8% |
| Cr | 8.5% |
| B | 1.2% |
| C | 1.8% |
| Si | 3.5% |

EXAMPLE 4

Rod electrode diameter 4.0 millimeters. Tungsten melt carbide granules 0.01 to .03 millimeters.

Mixture as in Example 1.

Weld parameters 26 volts and 190 amperes.

The wear-resistant layer is homogeneous as in Example 3.

| Analysis: | |
|---|---|
| Ni | 44.7% |
| W | 50.8% |
| B | 0.7% |
| C | 3.3% |
| Si | 1.0% |

We claim:

1. A process for applying a wear-resistant layer to an electrically conductive surface, comprising the steps of:
    (a) juxtaposing with said surface a consumable rod-shaped electrode comprised of a nickel tube and, within said tube, a filling consisting of:
    50 to 40 percent by weight nickel,
    45 to 55 percent by weight tungsten,
    0.1 to 1.5 percent by weight boron,
    3 to 4 percent by weight carbon, and
    0 to 2 percent by weight silicon,
    the sum of carbon, boron and silicon being substantially 5 percent by weight, and including a fluxing agent and tungsten carbide particles in said filling of a grain size of 0.3 to 2.0 mm in said tube, the compositions of said nickel tube and said filling making up 100% of said layer;
    (b) depositing said layer on said substrate by arc welding deposition from said rod-shaped electrode so that said layer is formed as a nickel-alloy matrix containing tungsten carbide grains as inclusions; and
    (c) controlling arc welding parameters of said arc welding deposition so that a voltage of 22 to 26 volts is applied across said rod-shaped electrode and said substrate and a current of 70 to 150 amperes passes between said rod-shaped electrode and said substrate, and such that there is practically no solubilization of said tungsten carbide grains in said nickel-allow matrix during the arc welding deposition.

2. A process for applying a wear-resistant layer to an electrically conductive surface, comprising the steps of:
    (a) juxtaposing with said surface a consumable filled-wire electrode comprised of a nickel tube and, within said tube, a filling consisting of:
    40 to 20 percent by weight nickel,
    10 to 4 percent by weight chromium,
    40 to 70 percent by weight tungsten,
    3 to 1 percent by weight boron,
    2 to 3 percent by weight carbon, and
    5 to 2 percent by weight silicon,
    and including a fluxing agent and tungsten carbide particles in said filling of a grain size of 0.3 to 2.0 mm in said tube, the compositions of said nickel tube and said filling making up 100% of said layer;
    (b) depositing said layer on said substrate by arc welding deposition from said rod-shaped electrode so that said layer is formed as a nickel-alloy matrix containing tungsten carbide grains as inclusions; and
    (c) controlling arc welding parameters of said arc welding deposition so that a voltaqge of 22 to 26 volts is applied across said rod-shaped electrode and said substrate and a current of 180 to 260 amperes passes between said rod-shaped electrode and said substrate, and such that there is practically no solubilization of said tungsten carbide grains in said nickel-alloy matrix during the arc welding deposition.

3. A process for applying a wear-resistant layer to an electrically conductive surface, comprising the steps of:
    (a) juxtaposing with said surface a consumable rod-shaped electrode comprised of a nickel tube and, within said tube, a filling consisting of:
    50 to 40 percent by weight nickel,
    45 to 55 percent by weight tungsten,
    0.1 to 1.5 percent by weight boron,
    3 to 4 percent by weight carbon, and
    0 to 2 percent by weight silicon,
    the sum of carbon, boron and silicon being substantially 5 percent by weight, and including a fluxing agent and tungsten carbide particles in said filling of a grain size of 0.1 to 0.3 mm in said tube, the compositions of said nickel tube and said filling making up 100% of said layer;
    (b) depositing said layer on said substrate by arc welding deposition from said rod-shaped electrode so that said layer is formed as a nickel-alloy matrix containing tungsten carbide grains as inclusions; and
    (c) controlling arc welding parameters of said arc welding deposition so that a voltage of 22 to 26 volts is applied across said rod-shaped electrode and said substrate and a current of 120 to 220 amperes passes between said rod-shaped electrode and said substrate, and such that said tungsten carbide particles are solubilized during said arc welding deposition and tungsten carbide inclusions are precipitated in said alloy matrix upon cooling thereof.

4. A process for applying a wear-resistant layer to an electrically conductive surface, comprising the steps of:
  (a) juxtaposing with said surface a consumable filled-wire electrode comprised of a nickel tube and, within said tube, a filling consisting of:
  40 to 20 percent by weight nickel,
  10 to 4 percent by weight chromium,
  40 to 70 percent by weight tungsten,
  3 to 1 percent by weight boron,
  2 to 3 percent by weight carbon, and
  5 to 2 percent by weight silicon, and including a fluxing agent and tungsten carbide particles in said filling of a grain size of 0.01 to 0.3 mm in said tube, the compositions of said nickel tube and said filling making up 100% of said layer;
  (b) depositing said layer on said substrate by arc welding deposition from said rod-shaped electrode so that said layer is formed as a nickel-alloy matrix containing tungsten carbide grains as inclusions; and
  (c) controlling arc welding parameters of said arc welding deposition so that a voltage of 22 to 26 volts is applied across said rod-shaped electrode and said substrate and a current of 200 to 320 amperes passes between said rod-shaped electrode and said substrate, and such that said tungsten carbide particles are solubilized during said arc welding deposition and tungsten carbide inclusions are precipitated in said alloy matrix upon cooling thereof.

5. The process defined in claim 1, claim 2, claim 3 or claim 4 wherein said tube has an outer diameter of 1.5 to 8 millimeters and a wall thickness of 0.2 millimeters.

6. The process defined in claim 1, claim 2, claim 3 or claim 4 wherein said tungsten carbide particles are composed of tungsten-fused-carbide granules, tungsten-fused-carbide in ball shape or tungsten carbide/cobalt pellets.

7. A rod electrode for applying a wear resistant layer to an electrically conductive surface by arc welding deposition which comprises:
  a nickel tube and, within said tube, a filling consisting of:
  50 to 40 percent weight nickel,
  45 to 55 percent weight tungsten,
  0.1 to 1.5 percent weight boron,
  3 to 4 percent weight carbon, and
  0 to 2 percent weight silicon,
  the sum of carbon, boron and silicon being substantially 5 percent by weight, and including a fluxing agent and tungsten carbide particles in said filling of a grain size of 0.3 to 2.0 mm in said tube, the compositions of said nickel tube and said filling making up 100% of said layer.

8. A rod electrode for applying a wear resistant layer to an electrically conductive surface by arc welding deposition which comprises:
  a nickel tube and, within said tube, a filling consisting of:
  50 to 40 percent by weight nickel,
  45 to 55 percent by weight tungsten,
  0.1 to 1.5 percent by weight boron,
  3 to 4 percent by weight carbon, and
  0 to 2 percent by weight silicon,
  the sum of carbon, boron and silicon being substantially 5 percent by weight, and including a fluxing agent and tungsten carbide particles in said filling of a grain size of 0.01 to 0.3 mm in said tube, the compositions of said nickel tube and said filling making up 100% of said layer.

9. A filled wire electrode for applying a wear resistant layer to an electrically conductive surface by arc weld deposition which comprises:
  a nickel tube and, within said tube, a filling consisting of:
  40 to 20 percent by weight nickel,
  10 to 4 percent by weight chromium,
  40 to 70 percent by weight tungsten,
  3 to 1 percent by weight boron,
  2 to 3 percent by weight carbon, and
  5 to 2 percent by weight silicon, and including a fluxing agent and tungsten carbide particles in said filling of a grain size of 0.3 to 2.0 mm in said tube, the compositions of said nickel tube and said filling making up 100% of said layer.

10. A filled wire electrode for applying a wear resistant layer to an electrically conductive surface by arc weld depostion which comprises:
  a nickel tube and, within said tube, a filling consisting of:
  40 to 20 percent by weight nickel,
  10 to 4 percent by weight chromium,
  40 to 70 percent by weight tungsten,
  3 to 1 percent by weight boron,
  2 to 3 percent by weight carbon, and
  5 to 2 percent by weight silicon,
  and including a fluxing agent and tungsten carbide particles in said filling of a grain size of 0.01 to 0.3 mm in said tubde, the compositions of said nickel tube and said filling making up 100% of said layer.

* * * * *